United States Patent [19]

Murphy et al.

[11] Patent Number: 5,126,870
[45] Date of Patent: Jun. 30, 1992

[54] LINEAR BROADBAND SIGNAL GENERATOR USING PRIMARY AND SECONDARY OPTICAL MODULATORS

[75] Inventors: Richard M. Murphy, Santa Clara; Peter W. Cornish, Pleasanton; Gregory S. Maurer, San Ramon, all of Calif.

[73] Assignee: Raynet Corporation, Menlo Park, Calif.

[21] Appl. No.: 455,104

[22] Filed: Dec. 22, 1989

[51] Int. Cl.$^5$ .................. H04J 14/02; H04B 10/00
[52] U.S. Cl. .................................. 359/124; 359/154
[58] Field of Search .................... 455/609–613, 455/618, 617, 6; 370/3; 350/96.13, 96.14; 359/124, 125, 133, 180, 181, 188, 154

[56] References Cited

U.S. PATENT DOCUMENTS

| | | | |
|---|---|---|---|
| 4,012,113 | 3/1977 | Kogelnik et al. | |
| 4,127,320 | 11/1978 | Li | 350/96.13 |
| 4,291,939 | 9/1981 | Giallorenzi et al. | 350/96.14 |
| 4,340,272 | 7/1982 | Papuchon et al. | 350/96.14 |
| 4,691,984 | 9/1987 | Thaniyavarn | 350/96.14 |
| 4,711,515 | 12/1987 | Alferness | 350/96.14 |
| 4,752,120 | 6/1988 | Shimizu | 455/616 |
| 4,769,853 | 9/1988 | Goodwin et al. | 455/616 |
| 4,798,434 | 1/1989 | Dammann et al. | 350/96.14 |
| 4,820,009 | 4/1989 | Thaniyavarn | 350/96.14 |
| 5,031,235 | 7/1991 | Raskin | 370/3 |

Primary Examiner—Edward L. Coles, Sr.
Assistant Examiner—Kinfe-Michael Negash
Attorney, Agent, or Firm—Dennis E. Kovach

[57] ABSTRACT

A linear optical broadband signal generator includes primary and secondary optical modulators whose outputs are combined so as to minimize intermodulation distortion of a modulated optical signal. A constant amplitude optical signal is split differentially so as to create primary and secondary power levels, the primary and secondary power levels being inputted into the primary and secondary modulators. An electrical input to one of the modulators is differentially attenuated so as to reduce third order modulation products when modulated outputs of the modulators are combined. In addition, the total modulated optical output power is maximized by adjustment to one of the outputs of one of the modulators so that its phase is more in line with a phase of the output of the other modulator so as to maximize first order products of the combined output.

20 Claims, 4 Drawing Sheets

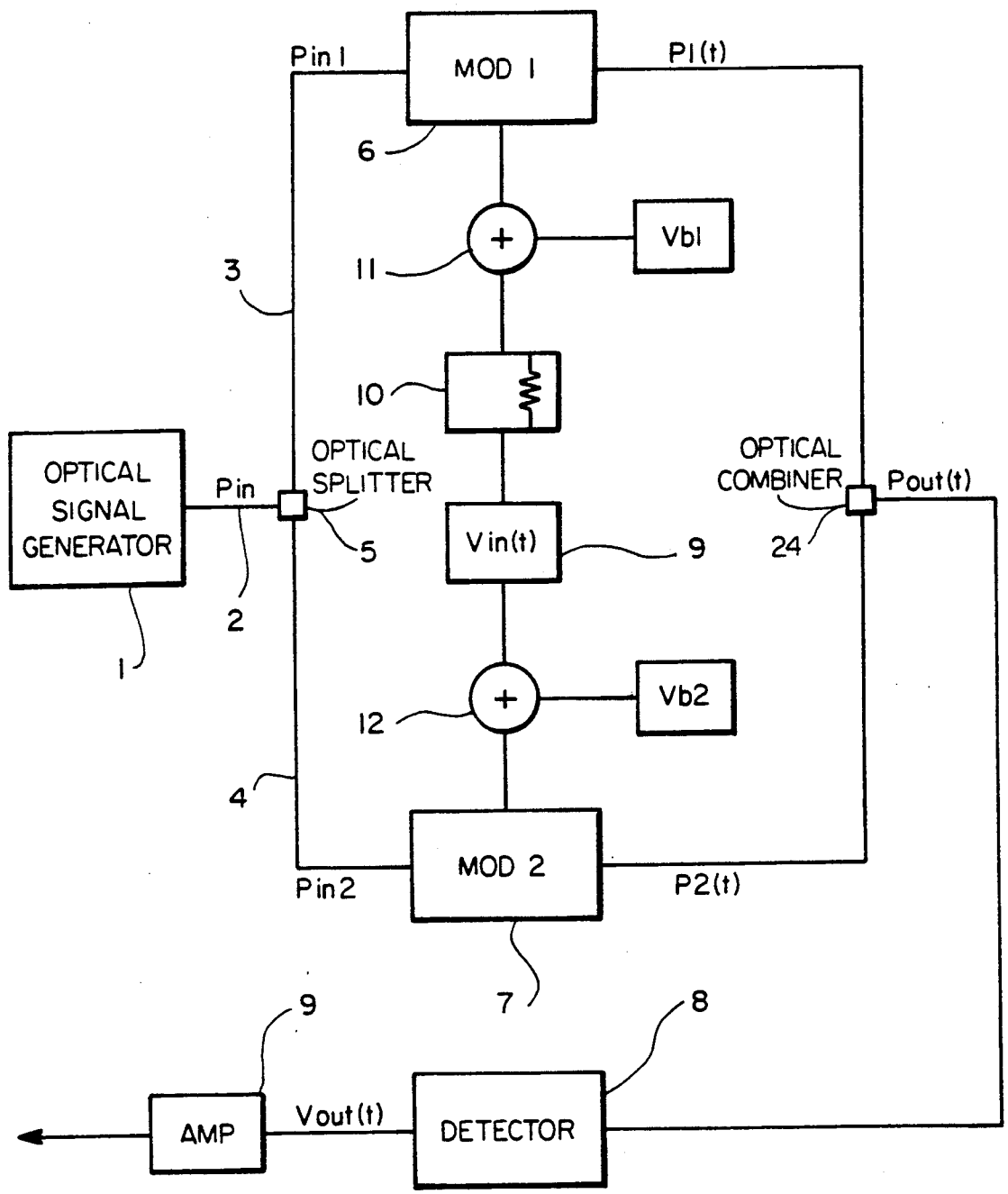
FIG_1

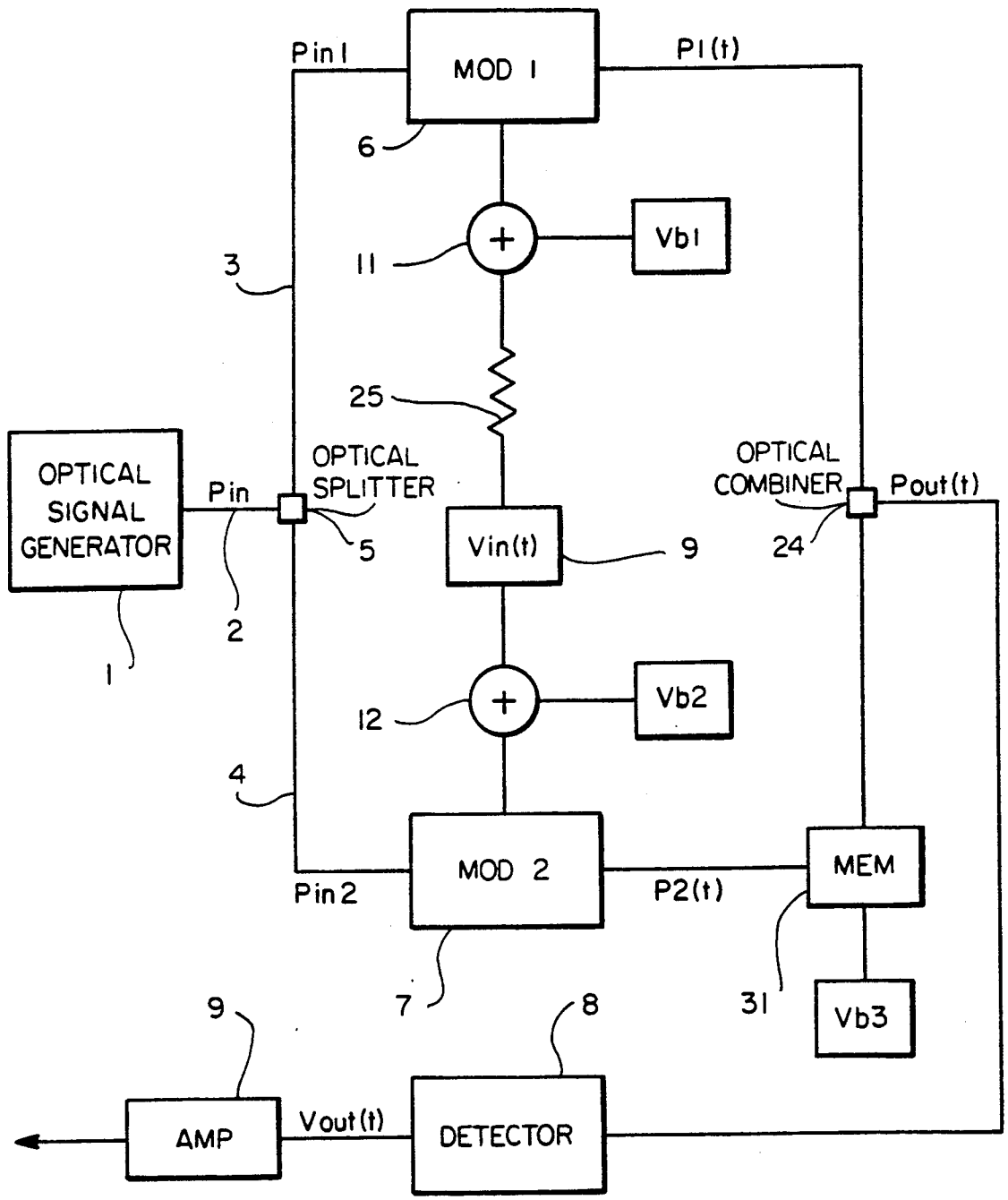
FIG_2

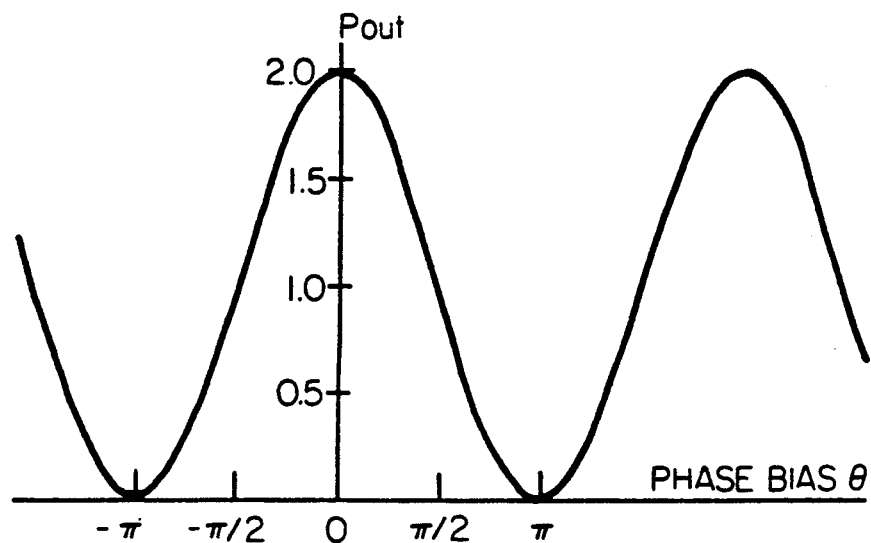
GENERAL EXTERNAL MODULATOR TRANSFER CHARACTERISTICS
FIG_3A
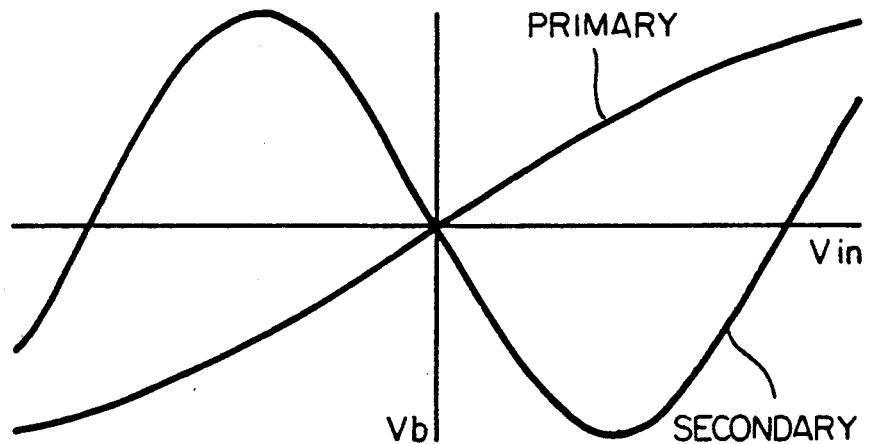
TRANSFER CHARACTERISTICS OF PRIMARY AND SECONDARY MODULATORS WITH RESPECT TO APPLIED VOLTAGE, INCLUDING EFFECTS OF ATTENUATOR IN ELECTRICAL PATH TO PRIMARY MODULATOR AND WITH BIAS LOCATIONS SUPERIMPOSED
FIG_3B

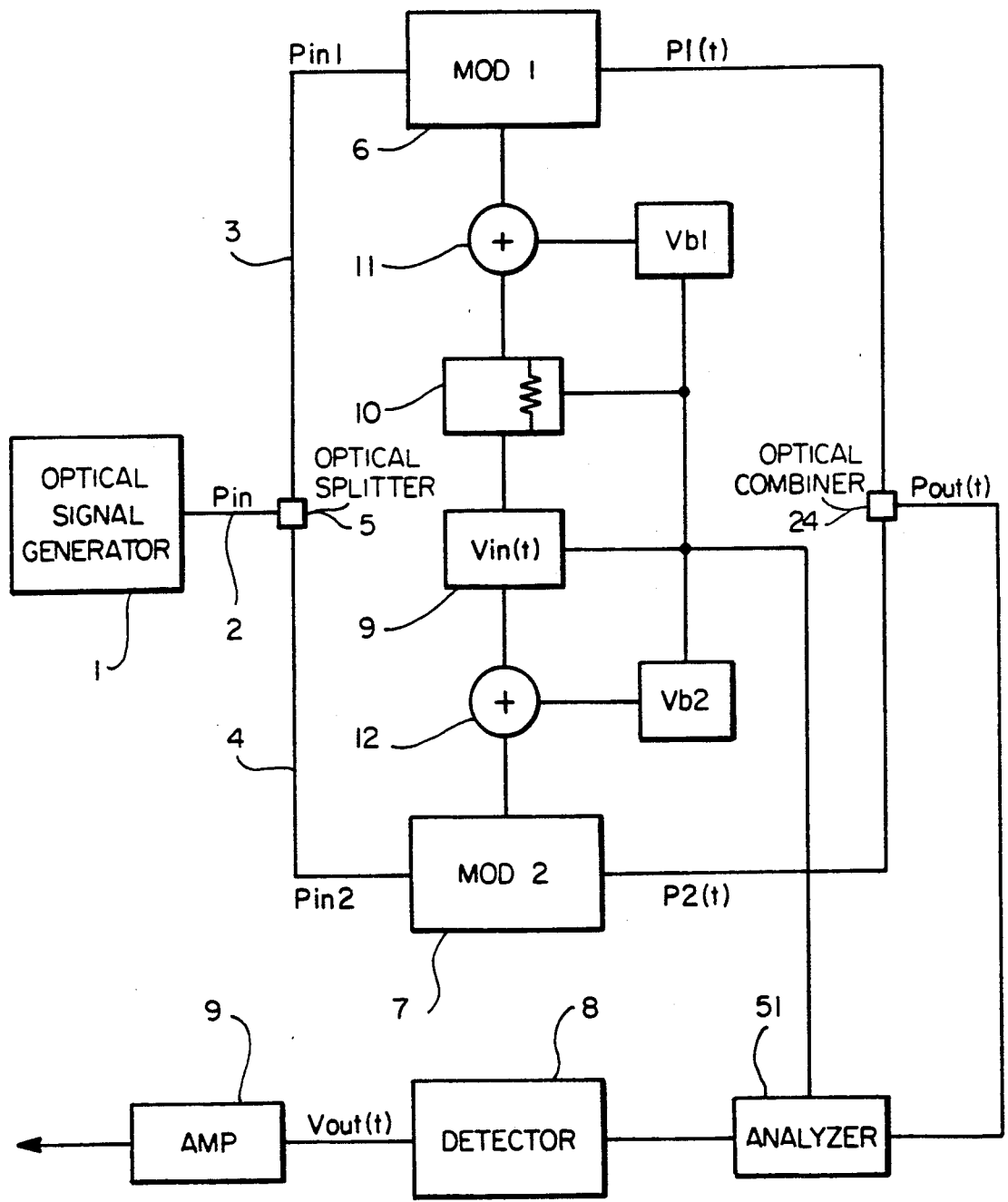
FIG_4

LINEAR BROADBAND SIGNAL GENERATOR USING PRIMARY AND SECONDARY OPTICAL MODULATORS

BACKGROUND OF THE INVENTION

The present invention relates to an intensity modulated optical signal generator which is capable of producing a linearized broadband optical signal, as required for frequency division multiplexed (FDM) amplitude modulated (AM) video.

With the advent of optical fiber technology wherein single mode optical fibers are now commonly available for transmitting information, a need exists for high bandwidth optical signal generators. Numerous high bandwidth optical signal generators have been proposed, however, each has its own drawbacks. Specifically, distributed feedback lasers are available for generating high bandwidth optical signals, but a disadvantage of such lasers is that the resulting high bandwidth signal has an undue amount of distortion and an undesirably low optical power output, especially when used for generating AM modulated signals.

It has also been proposed to generate a high bandwidth optical signal by utilizing a constant output laser and modulating an output thereof utilizing an external modulator, preferably a Mach-Zehnder interferometer. This technique also results in substantial signal output nonlinearities which are received as distortion. Johnson et al., U.S. application Serial Nos. 07/343,039; 07/412,656; and "Reduction of Intermodulation Distortion in Interferomic Optical Modulators" *Optic Letters*, Vol. 13, No. 10, October 1988, the disclosures of which are all incorporated herein by reference, disclose a method for substantially reducing nonlinearities attributable to third order products by adjusting relative amounts of the transverse electric (TE) and transverse magnetic (TM) power of an optical signal propagating through the external modulator to cancel the cubic dependence of the output optical power on drive voltage. More specifically, Johnson et al. propose to control the ratio of the power in the TE and TM modes by adjusting the polarization angle of polarized light at the optical input to the modulator such that the third order product of the modulated TE mode substantially cancels the third order product of the modulated TM mode. A preferred implementation of this technique is for use with a Mach-Zehnder interferometer.

Polarization control of a single external modulator to reduce third order products has two significant drawbacks. First, a frequency response of external modulators, in particular Mach-Zehnder modulators fabricated in lithium niobate (L1NbO3), is significantly different in the TE and TM modes. This effect ultimately limits the performance of the linearized modulator for broadband applications and is most significant below 200 MHz. Second, minimum second order distortion is only achieved when inflection points of the TE and TM transfer curves are precisely coincident and when the DC bias voltage is aligned to these inflection points. Unless the input polarization is precisely controlled electronically, the bias voltage must be used to achieve third order cancellation. However, since the bias control is optimally set to minimize second order products, using it to minimize third order products results in a direct tradeoff between second and third order distortion. Both cannot be optimized simultaneously with an external modulator unless the modulator is specially fabricated to very rigid specifications. In applications that demand very low distortion the single modulator implementation is most useful only for sub-optic applications where the second order distortion components fall out of band and can be filtered out electronically in a receiver.

SUMMARY OF THE INVENTION

It is an object of the present invention to provide a method and means for generating a modulated optical signal which has lower distortion than heretofore proposed.

It is a further object of the invention to provide a method and means for generating a modulated optical signal wherein third order modulation products are substantially eliminated as are all even order products.

This and other objects are achieved by a two modulator design that relies on a third order distortion cancellation technique that avoids the limitations of the polarization control single modulator approach.

According to one preferred embodiment, an optical carrier wave having a relatively constant amplitude is split into two branches by a non-symmetric optical power splitter, with the two branches being connected to primary and secondary external modulators, with most of the optical power propagating through one of the modulators, e.g. the primary modulator. The low power output branch is applied to the secondary modulator whose output is then recombined with a modulator output from the primary modulator at an output power combiner. Preferably, both modulators are identical in design, and bias voltages for each of the modulators are adjusted at inflection points of each modulator to minimize even order products. The bias points are also set so as to produce opposite polarity of modulation so as to allow for third order product cancellation, or alternatively any higher odd order product cancellation, as desired. Each modulator is modulated using a common RF electrical signal source, and an electrical attenuator is disposed between the RF signal generator and an input to the primary modulator to set a relative gain difference between the two modulators. According to this approach, by appropriately setting the value of the electrical attenuator, outputs from the primary and secondary modulators can be adjusted such that when their optical outputs are combined, third order products of one of the modulated outputs cancels third order products of the other modulated output.

According to an alternative preferred embodiment, instead of using a set electrical attenuator, a passive non-exact electrical attenuator in combination with a mode extinction modulator disposed downstream of an output of one of the modulators prior to this output being combined with an output from the primary modulator could be used.

Further embodiments also include a phase modulator in the path of one of the modulator outputs so as to optimize a total power output from the combined modulated optical signals, e.g. the first order product, by keeping the phase of the optical carriers at the optical combiner aligned.

According to yet a further embodiment, rather than using a single light source and the optical splitter as heretofore mentioned, it is also possible to provide separate incoherent light sources to drive the primary and secondary modulators which has the advantage of eliminating any kind of feedback loop for keeping outputs of the primary and secondary modulators optically in phase.

Preferaboly, the invention is implementable on a single integrated optical circuit. Titanium diffused lithium niobate is one preferred choice. Alternative modulators and/or manufacturing techniques are of course useable with the invention, for example proton exchange techniques on a lithium niobate substrate which yield high rejection of TM propagation modes.

These and other objects of the invention will be further explained by reference to the accompanying drawings and detailed description.

BRIEF DESCRIPTION OF THE DRAWINGS

FIG. 1 illustrates a first preferred embodiment of the invention whereby an electrical attenuator is precisely adjusted for reducing intermodulation distortion;

FIG. 2 illustrates an alternate embodiment of the invention whereby a passive electrical attenuator is used in combination with a mode extinction modulator which has a bias control which is alternatively adjusted for reducing intermodulation distortion;

FIGS. 3a, 3b illustrate transform curves representative of outputs of the primary and secondary modulators; and FIG. 4 illustrates a further embodiment of the invention which utilizes feedback control.

DESCRIPTION OF THE PREFERRED EMBODIMENTS

FIG. 1 illustrates a first preferred embodiment of the invention. Referring to this figure, an optical signal generator 1 transmits an optical carrier wave signal $P_{in}$ along path 2, e.g. a wave guide or air, the optical signal preferably having a relatively constant amplitude. $P_{in}$ is split into primary and secondary input paths 3, 4 via optical splitter 5 and coupled into primary and secondary modulators 6, 7 respectively. A radio frequency electrical signal generator 9 generates a modulated radio frequency electrical signal $V_{in}(t)$ and transmits the signal through electrical attenuator 10 which is then summed at 11 with primary voltage bias $V_b1$ disposed in series with $V_{in}(t)$. The summed signal is then transmitted to the primary modulator 6 so as to modulate its input $P_{in1}$. $V_{in}(t)$ is also transmitted through a secondary DC voltage bias control $V_{b2}$ and inputted into the secondary modulator 7 so as to modulate its input $P_{in}$. Outputs from the primary and secondary modulators $P_1(t)$ and $P_2(t)$ are combined by an optical combiner 24 so as to form $P_{out}(t)$. $P_{out}(t)$ is then transmitted to a remote detector 8 via any suitable means, e.g. single or multimode optical fiber, where it is converted into an electrical signal and optimally amplified by amplifier 9.

FIG. 2 illustrates another preferred embodiment of the invention wherein like components as described by reference to FIG. 1 have been similarly identified. In the embodiment of FIG. 2, the attenuator 10 of FIG. 1 has been replaced by a less precisely set attenuator 25, and an active mode extinction modulator 31 having a DC voltage bias control $V_{b3}$. Third order cancellation is achieved by precisely adjusting $V_{b3}$.

According to the invention, distortion cancellation is achieved as follows. The output of the modulators, $P_1(t)$ and $P_2(t)$ can be expressed as $P(t)$.

$$P(t) = \frac{P_{in}}{2} [1 + \text{Cos}(\phi(t) + \theta)]$$

where $\theta$ is proportional to a constant phase bias $V_b$; and $P_{in}$ is the input optical power (see FIG. 3a). The time varying phase modulation $\phi(t)$ is proportional to the modulator drive voltage $V_{in}(t)$.

For the primary modulator, 6 (FIG. 1), a phase bias voltage $V_{b1}$ is applied, corresponding to $\theta_1 = -\pi/2$. This is an inflection point on the Cosine curve, and modulation about this bias location will produce no even order distortion. $V_{b2}$ is set to provide $\theta_2 = \pi/2$ in the secondary modulator 7, also a point where no even order distortions are produced, but opposite in sign from $\theta_1$ providing modulation sense in opposition to that produced in the primary modulator 6. Optical input power $P_{in1}$ is applied to 6, and optical input power $P_{in2}$ is applied to 7. Other bias points satisfying $\theta = \pi/2 \pm n\pi$, n being an integer, may be used so long as the modulation senses of the two modulators are opposite of each other (FIG. 3b). The optical outputs for the two modulators can then be written:

$$P_1(t) = \frac{P_{in1}}{2} [1 + \text{Sin}(\phi_1(t))]$$

$$P_2(t) = \frac{P_{in2}}{2} [1 - \text{Sin}(\phi_2(t))]$$

The Sine functions can be series expanded, resulting in $$P_1(t) = \frac{P_{in1}}{2} \left[ 1 + \phi_1(t) - \frac{(\phi_1(t))^3}{3!} + \frac{(\phi_1(t))^5}{5!} - \cdots \right]$$

$$P_2(t) = \frac{P_{in2}}{2} \left[ 1 - \phi_2(t) + \frac{(\phi_2(t))^3}{3!} + \frac{(\phi_2(t))^5}{5!} + \cdots \right]$$

where the higher order terms, resulting in indiscernible distortions in real systems, have been truncated for this discussion.

The modulators have a sensitivity of voltage applied $V_{in}(t)$ to phase $\phi(t)$. This is usually defined in terms of the voltage required to change $\phi$ by $\pi$ radians, and is referred to as $V\pi$. The substitution $x = V_{in}(t)$ will be made for brevity in the expressions to follow. At the input to the primary modulator, applied voltage x is passed through an attenuator 10 having a voltage attenuation of $\gamma$. This corresponds to 20 log[$\gamma$] dB attenuation. The optical outputs of the two modulators can then be written as a function of their respective optical input power $P_{in}$, applied voltage x, voltage to gain sensitivities $V\pi$, and for the case of the primary modulator, electrical input attenuation constant $\gamma$.

$$P_1(t) = \frac{P_{in1}}{2} \left[ 1 + \left(\frac{1}{\gamma}\right)\left(\frac{\pi}{V_\pi}\right)x - \left(\frac{1}{\gamma}\right)^3 \left(\frac{\pi}{V_\pi}\right)^3 \frac{1}{3!} x^3 + \left(\frac{1}{\gamma}\right)^5 \left(\frac{\pi}{V_\pi}\right)^5 \frac{1}{5!} x^5 \cdots \right]$$

$$P_2(t) = \frac{P_{in2}}{2} \left[ 1 - \left(\frac{\pi}{V_\pi}\right)x + \right.$$

-continued $$\left(\frac{\pi}{V_\pi}\right)^3 \frac{1}{3!} x^3 - \left(\frac{\pi}{V_\pi}\right)^5 \frac{1}{5!} x^5 \ldots \right]$$

According to one embodiment, the optical splitter 5 is designed to have a power ratio between the two output ports of $\gamma^3$, such that $$P_{in1} = P_{in}\left[\frac{\gamma^3}{\gamma^3 + 1}\right] \text{ and } P_{in2} = P_{in}\left[\frac{1}{\gamma^3 + 1}\right]$$

This results in $$P_1(t) = P_{in}\left[\frac{\gamma^3}{\gamma^3 + 1}\right]\left[1 + \left(\frac{1}{\gamma}\right)\left(\frac{\pi}{V_\pi}\right)x - \left(\frac{1}{\gamma}\right)^3\left(\frac{\pi}{V_\pi}\right)^3\frac{1}{3!}x^3 + \left(\frac{1}{\gamma}\right)^5\left(\frac{\pi}{V_\pi}\right)^5\frac{1}{5!}x^5 \ldots\right]$$

and $$P_2(t) = P_{in}\left[\frac{1}{\gamma^3 + 1}\right]\left[1 - \left(\frac{\pi}{V_\pi}\right)x + \left(\frac{\pi}{V_\pi}\right)^3\frac{1}{3!}x^3 - \left(\frac{\pi}{V_\pi}\right)^5\frac{1}{5!}x^5 \ldots\right]$$

The phase modulators 6 and 7 provided with a DC voltage to set them at a fixed phase allows the phase of the optical carriers P₁(t) and P₂(t) to have zero offset as they are summed in optical combiner, 24. The output of this combiner has $P_{out}(t) = P_1(t) = P_2(t)$. As should be apparent by examination of the equations for P₁(t) and P₂(t), the coefficient for the cubic term of x is zero in the sum, $$P_{out}(t) = \frac{P_{in1}}{2}\left[1 + \left(\frac{\gamma^2 - 1}{\gamma^3 + 1}\right)\left(\frac{\pi}{V_\pi}\right)x + \left(\frac{\gamma^{-2} - 1}{\gamma^3 + 1}\right)\left(\frac{\pi}{V_\pi}\right)^5 \frac{1}{5!} x^5 \ldots\right]$$

In a practical embodiment, the selection of $\gamma^3$ may begin with the ratio of optical power in the paths from the primary and secondary modulators. From this, the value of the required electrical attenuator may be calculated.

Where there may be a difference $\alpha$ in modulation sensitivities $V_\pi$ between the primary and secondary modulators, such that $\alpha V_{\pi prim} = V_{\pi sec}$, the relationship between the optical power in the modulator paths and the electrical attenuation $\gamma$ may be modified such that the ratio in optical power equals $(\alpha\gamma)^3$ Alternative embodiments allow the required optical power ratio $\gamma^3$ to be produced by means than by the optical splitter 5. The required optical ratio may be produced by an unbalanced optical combiner 24 or by the use of a mode extinction modulator 31 as in FIG. 2.

Precise setting of the attenuator will allow complete third order cancellation. The primary and secondary DC voltage bias controls $V_{b1}$ and $V_{b2}$ are adjusted so as to produce operation of the modulators at specific bias points, i.e. inflection points on their respective transfer curves with opposite modulation sensitivities. Since the modulation sense is opposite it is possible to set the attenuator 10 so as to minimize any desired odd order modulation product, optimally third order products. Also, since operation is around the inflection points, all even ordered distortions can be eliminated as well. The exact setting will allow modulation with no even order products.

According to a further preferred embodiment, the combined modulated carrier wave output $P_{out}(t)$ can be analyzed using an analyzer 51 (FIG. 4). Active feedback control can then be utilized so as to precisely minimize any desired output modulation distortion product. Specifically, the analyzer could be set to analyze even ordered modulation products and hence actively control the phase bias voltages $V_{b1}$ and $V_{b2}$ if desired so as to insure that these products are maintained at a minimum, preferably 0. In addition, the analyzer could also analyze third ordered products and actively control either the magnitude of the attenuation of the electrical signal inputted to the primary modulator or the mode extinction modulator of FIG. 2, for example. Alternate embodiments would include active power splitters 5 and active power combiner 24 which could be controlled as well if desired, all such embodiments being included within the invention.

According to a preferred embodiment, the modulator design is preferably precisely implemented on a single integrated optical circuit. In addition, a further embodiment would be the design of a circuit such that optimum distortion cancellation is achieved without any active control so as to simplify product design, though active control using the analyzer 51 could be utilized if desired.

Though the invention has been described by reference to certain preferred embodiments thereof the invention is not to be so limited and is only to be limited by the accompanying claims.

What is claimed is:

1. An apparatus for reducing intermodulation distortion in a modulation system, comprising:
   a primary modulator;
   a secondary modulator;
   means for generating an electrical modulation signal;
   means for directing the signal along first and second paths so as to be applied to the primary and secondary modulators respectively, an intensity of the electrical signal applied to the primary modulator being less by a factor of $\gamma$ than an intensity of the electrical signal applied to the secondary modulator;
   means for generating primary and secondary optical carrier waves, the primary and secondary modulators modulating the primary and secondary optical carrier waves respectively using the applied signals;
   means for combining the modulated primary and secondary carrier waves such that when combined an odd power non-linearity of the modulated primary carrier wave is substantially offset by an odd power non-linearity of the modulated secondary carrier wave.

2. The apparatus of claim 1, the odd power non-linearity corresponding to a cubic non-linearity.

3. The apparatus of claim 2, a ratio of a modulation sensitivity of the secondary modulator to the primary modulator being, a ratio of a power of the modulated primary carrier wave to a power of the modulated secondary carrier wave in a combined modulated carrier wave created by the combining means being approximately $(\alpha\gamma)^3$.

4. The apparatus of claim 2, a ratio of a power of the modulated primary carrier wave to a power of the modulated secondary carrier wave in a combined modulated carrier wave created by the combining means being approximately $\gamma^3$.

5. The apparatus of claim 1, the directing means also applying a primary and secondary phase bias signal to the primary and secondary modulators respectively, the phase bias signal applied to the secondary modulator producing a modulation sense opposite to that produced by the phase bias signal applied to the primary modulator.

6. The apparatus of claim 5, each phase bias signal applied corresponding to an inflection point on a transfer power output curve for the primary and secondary modulators respectively so as to minimize even order distortions in the modulated primary and secondary carrier waves.

7. The apparatus of claim 1, a ratio of an unmodulated primary carrier wave to an unmodulated secondary carrier wave being approximately $\gamma^3$.

8. The apparatus of claim 1, the combining means including an optical combiner which provides an optical summation of the modulated carrier waves in an unbalanced manner.

9. The apparatus of claim 2, the generating means comprising means for generating a single optical carrier wave, and means for splitting the single optical carrier wave into first and second parts, the first part corresponding to an unmodulated primary carrier wave, the second part corresponding to an unmodulated secondary carrier wave.

10. The apparatus of claim 2, further comprising means for applying a mode extinction modulator to one of the modulated primary and secondary carrier waves.

11. The apparatus of claim 2, further comprising means for adjusting a phase of one of the modulated carrier waves so as to maximize a power of a combined modulated carrier wave created by the combining means.

12. The apparatus of claim 9, a path length of the primary and secondary carrier waves between the splitting means and the combining means differing by multiples of $2\pi$ allowing maximum construct interference in a combined modulated carrier wave created by the combining means.

13. The aparatus of claim 2, further comprising feedback control means for dynamically analyzing non-linearities in a combined modulated carrier wave and controlling at least one variable so as to minimize a magnitude of the analyzed non-linearities.

14. The apparatus of claim 13, the variable consisting of at least one of an amount of atteuation to the electrical signal applied to the primary modulator, an angle of the phase bias signals applied to either one of the primary and secondary modulators, and an intensity of either one of the unmodulated primary and secondary carrier waves, so as to minimize intermodulation distortion products.

15. The apparatus of claim 1, the generating means comprising at least one incoherent light source.

16. A method of reducing intermodulation distortion in a modulation system, comprising the steps of:
generating an electrical modulation signal;
directing the signal along first and second paths into a primary and a secondary modulator, an intensity of the electrical signal directed into the primary modulator being less by a factor of $\gamma$ than an intensity of the electrical signal directed into the secondary modulator;
modulating primary and secondary optical carrier waves using the electrical signal;
combining the modulated primary and secondary carrier waves such that when combined an odd power non-linearily of the primary carrier wave is substantially offset by a like odd power non-linearity of the secondary carrier wave.

17. The method of claim 16, the odd power non-linearity corresponding to a cubic non-linearity.

18. A system for generating an optical signal having reduced intermodulation distortion, comprising:
a primary modulator;
a secondary modulator;
means for generating an electrical modulation signal;
means for directing the signal along first and second paths so as to be applied to the primary and secondary modulators respectively, an intensity of the electrical signal applied to the primary modulator being less by a factor of $\gamma$ than an intensity of the electrical signal applied to the secondary modulator;
means for generating primary and secondary optical carrier waves, the primary and secondary modulators modulating the primary and secondary optical carrier waves respectively;
means for combining the modulated primary and secondary carrier waves such that when combined an odd power non-linearity of the modulated primary carrier wave is substantially offset by a like odd power non-linearity of the modulated secondary carrier wave;
a transmission optical fiber;
means for injecting the combined modulated carrier wave into the optical fiber;
means for detecting the combined modulated carrier waves from the optical fiber.

19. The system of claim 18, further comprising means for amplifying the detected combined modulated carrier wave, the odd power non-linearity corresponding to a cubic non-linearity.

20. The system of claim 19, the signal comprising a CATV signal including a plurality of television stations, the CATV signal comprising a frequency division multiplexed amplitude modulated video signal.

* * * * *